United States Patent [19]

Yoshimura et al.

[11] Patent Number: 5,896,413
[45] Date of Patent: Apr. 20, 1999

[54] APPARATUS FOR AND METHOD OF TRANSMITTING DATA

[75] Inventors: Kouichi Yoshimura; Takanori Hisanaga; Yuji Kozawa; Katsuya Mitsutake, all of Nakai-machi, Japan

[73] Assignee: Fuji Xerox Co., Ltd., Tokyo, Japan

[21] Appl. No.: 08/861,561

[22] Filed: May 22, 1997

[30] Foreign Application Priority Data

May 27, 1996 [JP] Japan .................................. 8-132352

[51] Int. Cl.$^6$ .................................................. H04B 1/38
[52] U.S. Cl. .......................... 375/219; 375/219; 375/222; 370/216
[58] Field of Search ...................... 375/222, 219; 395/200.3, 200.54, 200.09, 200.53, 184.01, 185.01, 185.03; 370/254, 232, 37.1, 462, 350, 249, 447, 216; 371/32, 33, 35

[56] References Cited

U.S. PATENT DOCUMENTS

| | | | |
|---|---|---|---|
| 4,829,524 | 5/1989 | Yoshida | 371/32 |
| 4,924,456 | 5/1990 | Maxwell et al. | 370/296 |
| 4,970,714 | 11/1990 | Chen et al. | 370/216 |
| 5,541,955 | 7/1996 | Jacobsmeyer | 375/222 |

FOREIGN PATENT DOCUMENTS

A-8-17989  1/1996  Japan .

*Primary Examiner*—Stephen Chin
*Assistant Examiner*—Shuwang Liu
*Attorney, Agent, or Firm*—Oliff & Berridge, PLC

[57] ABSTRACT

A contention control system unitarily manages a plurality of data transmissions so as to avoid contention therebetween. Data transmission command sending equipment of a data receiver continuously sends data transmission commands to a data sender according to a data transmission request. Data transmission-command receive control equipment receives the first valid one of the continuously-delivered data transmission commands therein and delivers it to data transmission control equipment. Correspondingly, data sending equipment starts to transmit data. Data transmission monitoring equipment of the data receiver monitors the state of transmission of the data. When the data transmission corresponding to the data transmission commands is made, the data transmission monitoring equipment detects it and notifies the result of detection to data transmission-command transmit control equipment, which in turns terminates the notification of the data transmission commands in response to its notification delivered from the data transmission monitoring equipment. Thus, a reduction in the efficiency of bandwidth utilization at the time that transmission errors are produced in the notification of the above commands can be restrained.

11 Claims, 11 Drawing Sheets

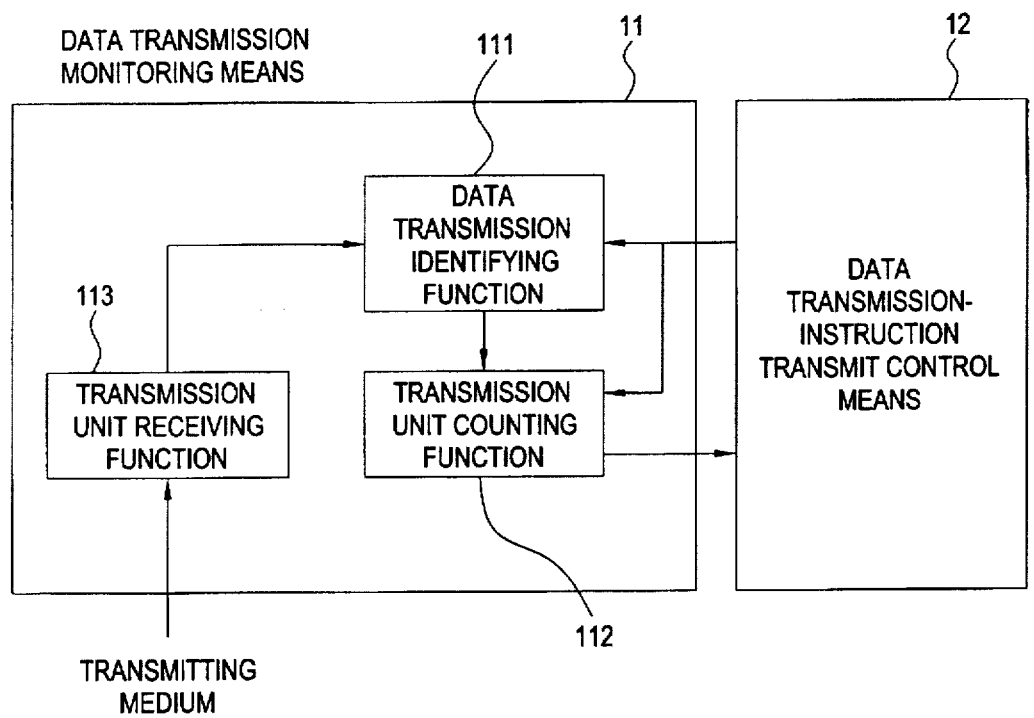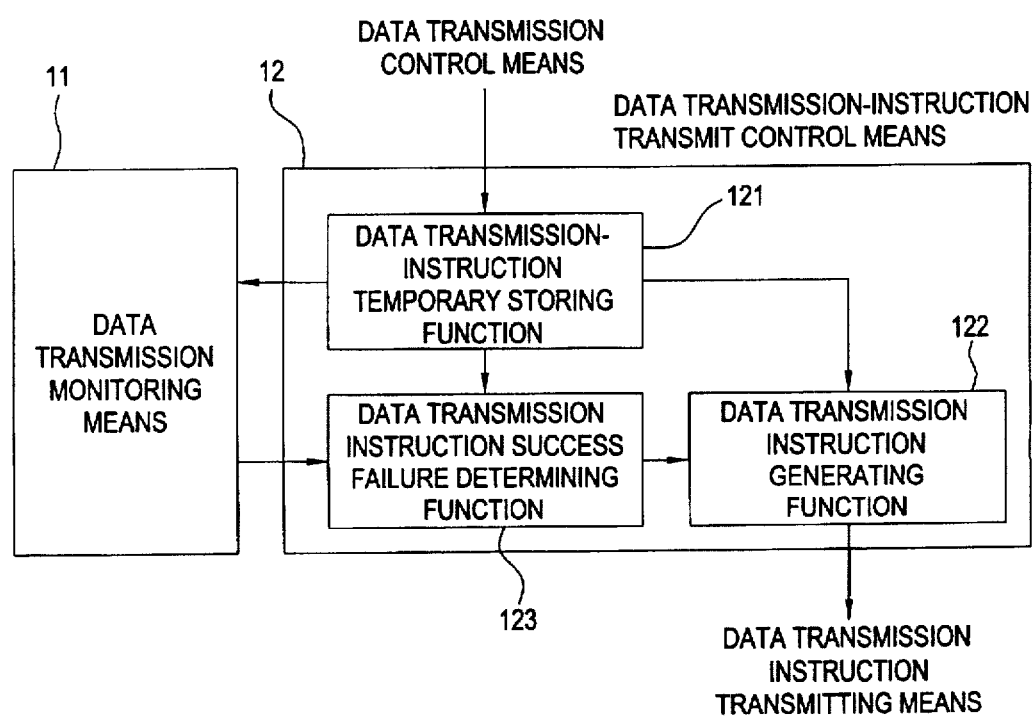

APPARATUS FOR AND METHOD OF TRANSMITTING DATA

BACKGROUND OF THE INVENTION

1. Field of Invention

The present invention relates to a data transmission apparatus for controlling contention between a plurality of data transmissions when the data transmissions are performed on a shared sending medium in a computer network, and a method therefor.

2. Description of Related Art

A computer network comprises a sending medium and a plurality of terminals electrically connected to the sending medium. The transfer of data between the respective terminals is performed through the sending medium. Transmission capability of the sending medium is expressed in the form of the amount of transmit data per unit time. This will be referred to as "transmission bandwidth [unit: bit/sec]". A plurality of data transmissions shares the use of the same sending medium by using the transmission bandwidth in divided form. The transmission bandwidth is a finite shared resource.

A bandwidth or bit rate to be used for the transmission of data changes momentarily according to the demand of each application. When the sum of bit rate used for respective data transmissions at arbitrary times is greater than the transmission bandwidth of the sending medium, the shortage of the transmission bandwidth is produced. Thus, this cannot satisfy all the data transmissions and hence a struggle for the transmission bandwidth occurs between the respective data transmissions. This will be called "contention between the transmission bandwidth" When the contention takes place, data incapable of acquiring a necessary bandwidth are dropped or lost without transmission.

When the data has dropped, the corresponding data is normally transmitted again for its recovery. This will be referred to as "redelivery or retransmission". Namely, since the term "retransmission" means that the same data is transmitted plural times to make a success of the data transmission, an increase in transmission delay time and a reduction in the efficiency [=the amount of transmitted effective or valid data/(bandwidth necessary for the transmission of the valid data×time required to transmit the data)] of utilization of the transmission bandwidth occur. Accordingly, a contrivance to avoid the contention beforehand is necessary. This will be called "contention control".

If attention is given to file transfer, print service, etc. of various applications for performing data transmissions, then the following features are brought about:(1) Data to be transmitted exists at a sending terminal or end before the commencement of the data transmission and the amount of its data is already known.(2) Data transmission control information such as the amount of data is generally exchanged between sending and receiving terminals before the commencement of the data transmission.(3) Since data to be transmitted already exists within a sending terminal, a transmission bandwidth to be used can be controlled.(4) The allowable range of a transmission delay is relatively large. (5) In client/server type applications such as a file service/ print service, etc., all the data transmissions are concentrated on a server.

Therefore, the present applicant has proposed a contention control method which has focused attention on the above-described features (see Japanese Patent Application No. Hei 8-17989) According to the present proposal, for, example, the sequence of data transmissions and bandwidth used for the data transmissions are unitarily controlled based on control information about the data transmissions concentrated on a server beforehand to thereby avoid contention between the data transmissions.

A contention control operation of the data transmission apparatus described in Japanese Patent Application referred to above will be described by one example comprising a data sender, a data receiver and a sending medium In the present example, the data receiver controls the sequence of the data transmissions, the bandwidth used for the data transmissions and the like on a unitary basis. FIG. 1 shows the configuration of the present example. FIG. 2 is a diagram for describing the operation of the present example.

(1) Data receiver 2:

The data receiver 2 comprises data transmission control information acquiring means 7, data transmission control means 8, data transmission command sending means 9, data receiving means 10, etc. The data transmission control information acquiring means 7 obtains necessary information from control information exchanged between the data sender and the data receiver before, between and after all the data transmissions. Before the data transmissions, for example, the data transmission control information acquiring means 7 acquires an identifier for a corresponding data sender 1, the amount of data to be transmitted, etc. The data transmission control means 8 determines the time at which a data transmission having the contents described in data transmission control information acquired by the data transmission control information acquiring means 7 is made possible, and an available transmission bandwidth, based on the data transmission control information and the use situation with regard to a bandwidth according to a data transmission being in execution. The data transmission command sending means 9 transmits data transmission commands including the contents determined by the data transmission control means 8 to the data sender 1. Further, the data receiving means 10 receives therein framed data transmitted from the corresponding data sender 1.

(2) Data sender 1:

The data sender 1 comprises data transmission command receiving means 4, data transmission control means 5, data sending means 6, etc. The data transmission command receiving means 4 receives therein data transmission commands sent from the data transmission command sending means 9 of the data receiver 2. The data transmission control means 5 controls the start/end of the transmission of data by the data sending means 6, the bit rate for its data transmission, etc. in accordance with the data transmission commands received by the data transmission command receiving means 4. Further, the data sending means 6 transmits data to the data receiver 2 under the control of the data transmission control means 5.

On the other hand, when the data is transmitted over the sending medium, there is a possibility that a signal error will take place due to noise or the like, or data will drop due to a signal error, buffer overflow in a repeater and the like. This will be called "transmission error". There may be cases in which the transmission error is detectable and undetectable. When the transmission error is detected, data subjected to the transmission error is recovered. This will be called "error correction". As an error correcting system, there are known an FEC (Forward Error Correction) system and a reforward or retransmission system. However, the RETRANSMISSION system can effect a 100% correction on the transmission error in principle. Since a transmission error in transmitted data can be detected only at a receiving terminal or end, whereas the corresponding data can be retransmitted only from a sending terminal or end at which it holds the data, feedback for confirming the delivery of the data from the receiving end to the sending end is essential to the retransmission system.

A handshake procedure for confirming the delivery of data by the conventional retransmission control system includes two systems shown below.

1) A system for sequentially feeding back the success or failure of a data transmission (see FIG. 3)

2) A retransmission or redelivery requesting system (see FIG. 4)

At this time, the following overhead times will be produced.

The time required to generate a response or retransmission request indicative of the success or failure of data transfer at the receiving end.

The time required to transmit the response or retransmission request indicative of the success or failure of the data transfer from the receiving end to the sending end (transmission delay time).

When no transmission error is detected, there is a danger that an event that the receiving side will cause a malfunction and an event, a so-called "deadlock" that the sending side continues to eternally wait for a response issued from the receiving side or vice versa, will occur. Thus, when one of the sending end and the receiving end does not receive a response to be expected from the other thereof within a predetermined time, either one of them performs the retransmission or redelivery of data to the other or discontinues the transfer of data to the other to thereby notify it to an application, whereby the deadlock is avoided. Such a timeout process is shown in FIG. 5. At this time, the following overhead time is produced.

A timeout interval for avoiding the deadlock when no data drop is detected.

Since the transmission bandwidth of the sending medium, the transmission delay time, the processing times in the repeater and the sender and receiver, etc. are not yet known at the instant of the timeout, the timeout interval is generally set to a time interval sufficiently longer than the time necessary for the normal transmission of data.

Referring back to the example shown in FIG. 1, when the transmission error is produced in the data transmission commands sent from the data transmission command sending means 9 upon transmission of the data transmission commands thereof, it is erroneously received or not received at all by the data transmission command receiving means 5. Accordingly, the data sender 1 does not comply with the unitary decision made by the data transmission control means 8, thus resulting in the failure of control on contention between the data transmissions. In this case, there is a danger that an event that the transmission of data is not started eternally due to the occurrence of the deadlock, will occur as well as no hope in the improvement in the efficiency of utilization of a bandwidth. Therefore, there is a demand for applying reliability against the transmission error to the data transmission commands so as to avoid the failure of the contention control.

However, when one attempts to correct the transmission error by the conventional retransmission system to avoid it, a non-used bandwidth at which no data transmission is actually done, is produced within the above overhead time even though the bandwidth used for the transfer of data from the sender to the receiver has been ensured. A penalty against the occurrence of the transmission error is large, so that a reduction in the efficiency of utilization of the bandwidth is caused.

SUMMARY OF THE INVENTION

With the foregoing in view, the present invention relates to a contention control system for unitarily managing a plurality of data transmissions so as to avoid contention therebetween. It is an object of the present invention to minimize a reduction in the efficiency of utilization of a bandwidth even when a transmission error is produced upon notification of data transmission commands.

According to one aspect of the present invention, for achieving the above object, there is provided a data transmission apparatus having a data sender and a data receiver and wherein data outputted from the data sender is transmitted to the data receiver through a data sending medium and the data receiver transmits data transmission commands to the data sender prior to the transfer of the data from the data sender to the data receiver, comprising:

means for monitoring a form of the transmission of the data from the data sender to the data receiver;

means for controlling the transmission of the data transmission commands, based on the result of monitoring by the monitoring means; and means for detecting a transmission error in the data transmission commands and a duplicate thereof to thereby control the reception of the data transmission commands.

According to the above construction, since a decision as to whether the data transmission commands notified from the data receiver to the data sender are suitably transmitted or received when the plurality of data transmissions are controlled or managed on a unitary basis so as to avoid contention therebetween, is made by monitoring the form of a data transmission done as a result of the notification of the data transmission commands, it is possible to eliminate the need for purposely effecting transmission confirming feedback from the data sender to the data receiver and to reliably perform the data transmission commands. The present construction is able to eliminate handshaking for retransmission control.

In this construction, the form of the data transmission may be the presence or absence of a data transmission or a bit rate to be used for the data transmission.

According to another aspect of the present invention, for achieving the above object, there is provided a method of sending data from a data sender to a data receiver through a data sending medium, comprising the following steps of:

a step for continuously sending data transmission commands from the data receiver to the data sender prior to the transfer of the data from the data sender to the data receiver;

a step for starting the transmission of the data from the data sender without duplicating, based on the continuously-transmitted data transmission commands;

a step for monitoring a form of the transmission of the data from the data sender to the data receiver; and a step for terminating the transmission of the data transmission commands, based on the result of the above monitoring.

Even in the case of the present construction, the handshaking for the retransmission control is unnecessary and the data transmission commands can be reliably forwarded from the data receiver to the data sender.

Further, the present invention can be also materialized as the data sender and the data receiver.

BRIEF DESCRIPTION OF THE DRAWINGS

FIG. 7 is a block diagram illustrating an example of a configuration of data transmission monitoring means 11 employed in a first embodiment of the present invention;

FIG. 8 is a block diagram depicting an example of a configuration of data transmission-command transmit control means 12 employed in the first embodiment;

DETAILED DESCRIPTION OF PREFERRED EMBODIMENTS

Figure 1:
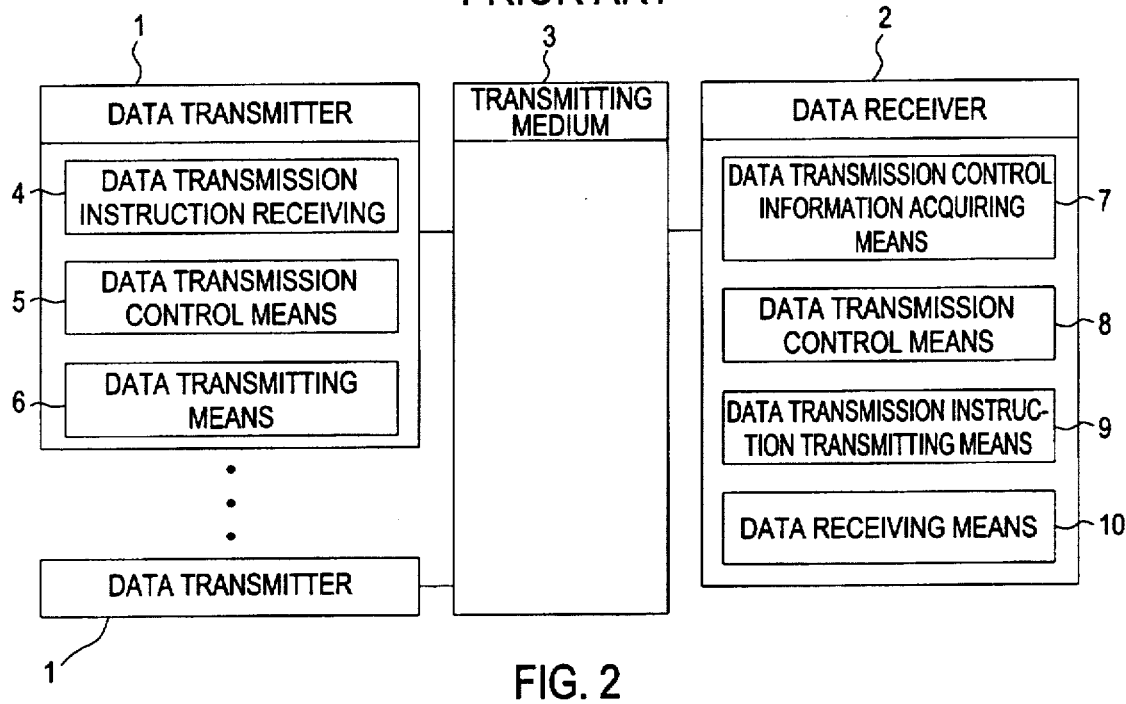
FIG. 1 is a diagram showing a configuration of a data transmission apparatus of a related art.
Figure 2:
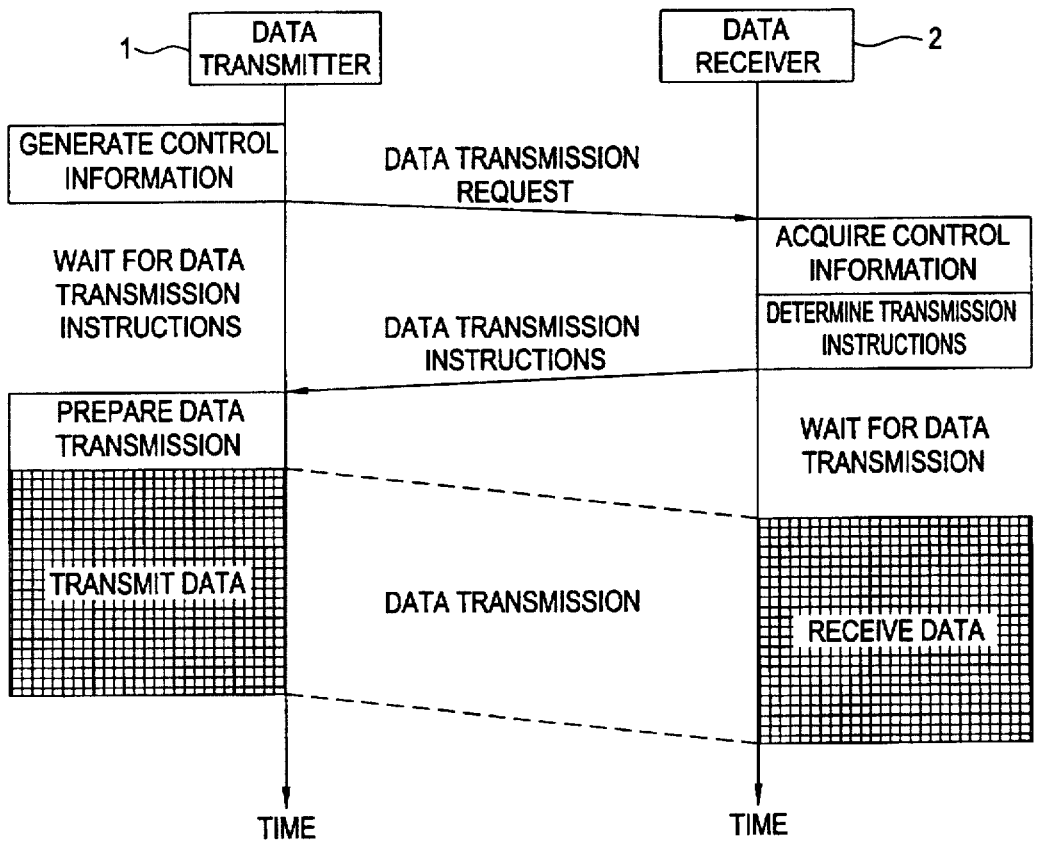
FIG. 2 is a diagram for describing the operation of the data transmission apparatus shown in FIG. 1.
Figure 3:
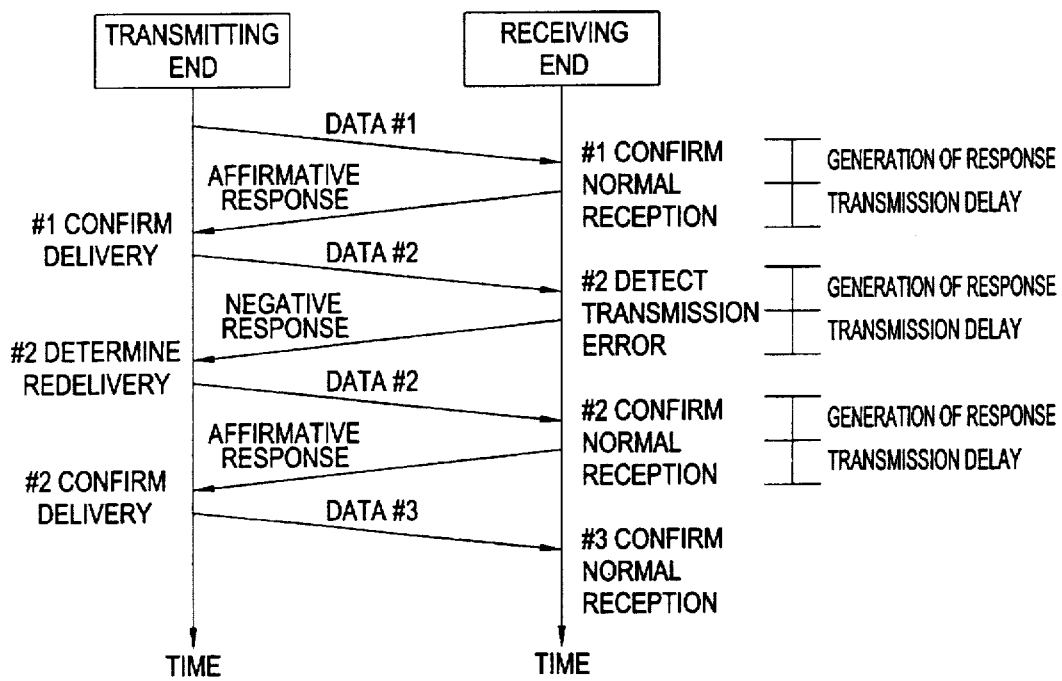
FIG. 3 is a diagram for describing the operation of a conventional data retransmission system.
Figure 4:
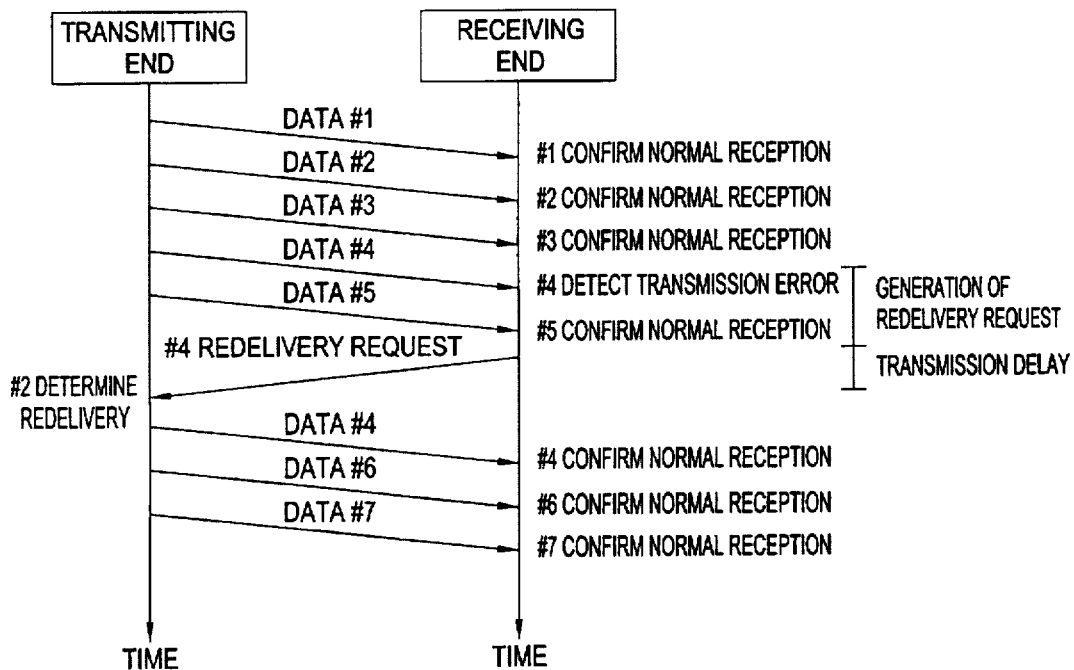
FIG. 4 is a diagram for describing the operation of another conventional data retransmission system.
Figure 5:
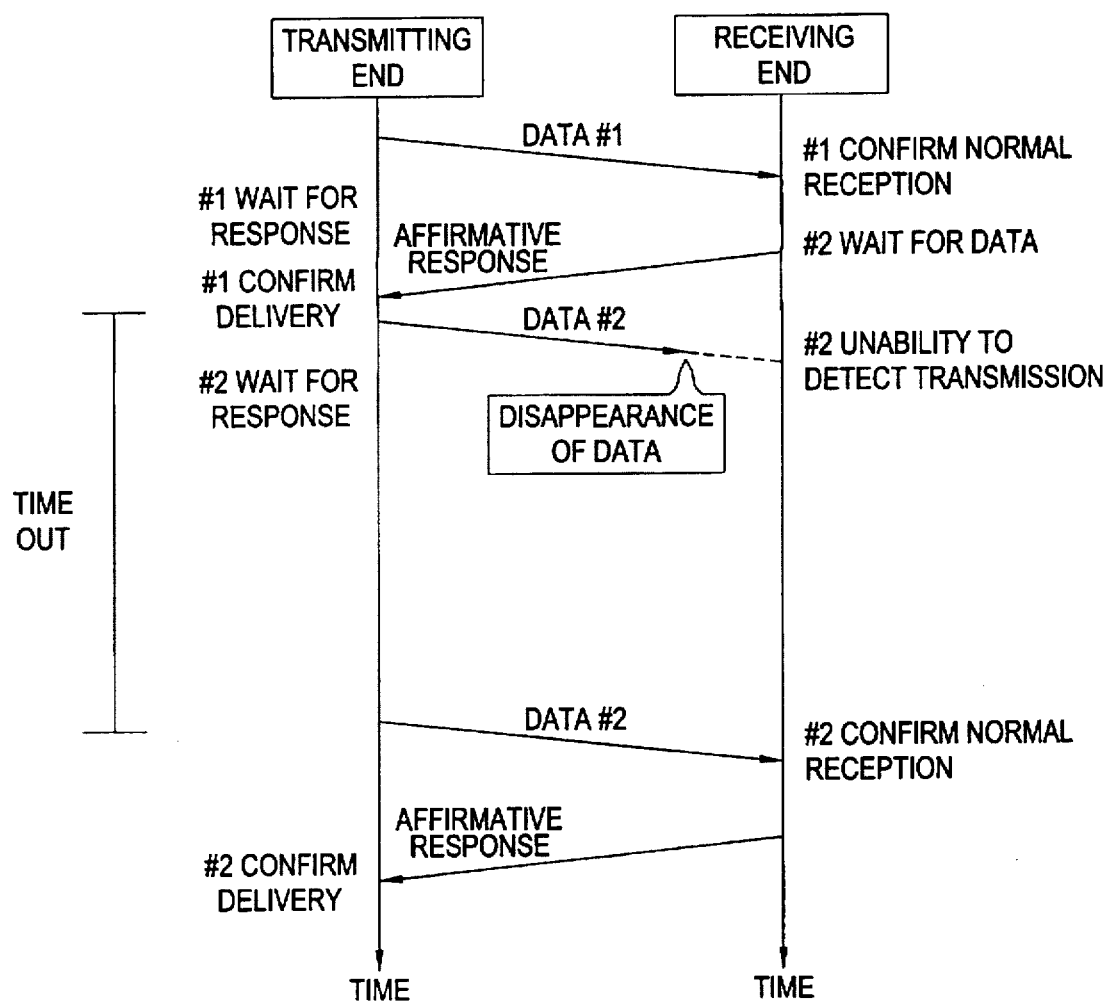
FIG. 5 is a diagram for describing a conventional deadlock avoidance operation.
Figure 6:
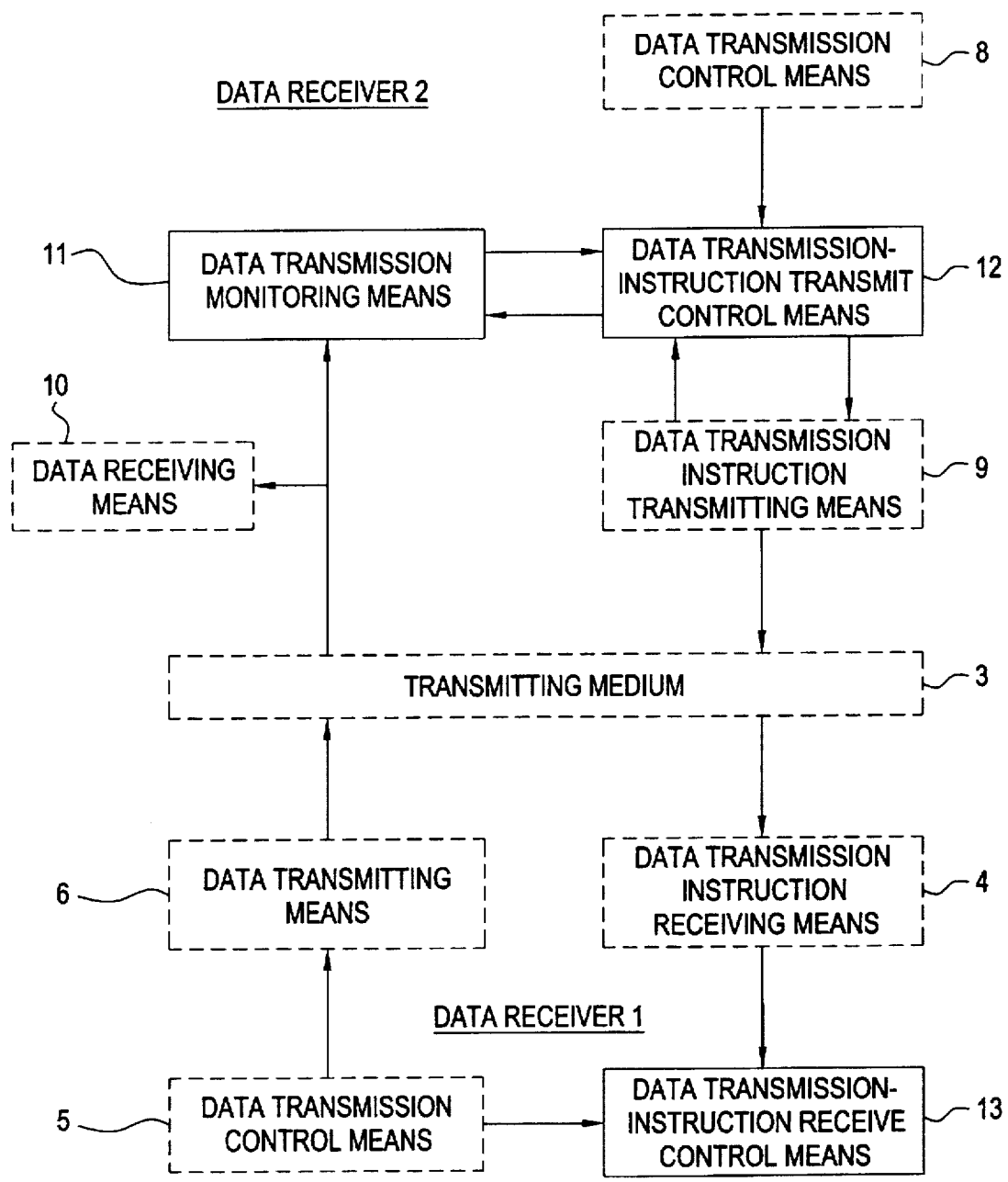
FIG. 6 is a block diagram showing a basic configuration of the present invention.

The present invention will hereinafter be described in detail. FIG. 6 is a diagram for describing a basic configuration of the present invention. In the drawing, data transmission monitoring means 11, data transmission-command transmit control means 12 and data transmission-command receive control means 13 are provided within a data transmission apparatus equipped with a unitary contention control function. In FIG. 6, portions corresponding to those shown in FIG. 1 are identified by their corresponding reference numerals and their detailed description will be omitted.

In a data receiver 2, the data transmission monitoring means 11 monitors the state or form of transmission of data transmitted over a sending medium 3 under the control of the data transmission-command transmit control means 12 so as to obtain information about the situation with regard to the use of a bandwidth for the data transmission. The data transmission monitoring means 11 sends the information to the data transmission-command transmit control means 12. The data transmission-command transmit control means 12 controls the transmission of commands for the data transmission, based on the information transmitted thereto from the data transmission monitoring means 11.

In a data sender 1, the data transmission-command receive control means 13 detects a transmission error produced in the data transmission commands and a duplicate thereof and controls the reception of the data transmission commands. The data transmission commands, which cause the transmission error (which fails to be corrected), are abandoned. Further, the same data transmission commands as the immediately preceding received-commands for the data transmission are also abandoned.

When data is transferred from the data sender 1 to the data receiver 2, data transmission command sending means 9 of the data receiver 2 continuously sends data transmission commands to the data sender 1 according to a data transmission request. The data transmission-command receive control means 13 receives therein the initial effective or valid one of the data transmission commands continuously delivered from the data transmission command sending means 9 and delivers it to data transmission control means 5. Correspondingly, data sending means 6 transmits data to the data receiver 2.

Data receiving means 10 of the data receiver 2 receives the data delivered from the data sending means 6 therein. Further, the data transmission monitoring means 11 monitors the manner of transmission. When a data transmission corresponding to the data transmission commands is performed, the data transmission monitoring means 11 detects its data transmission and notifies it to the data transmission-command transmit control means 12. Correspondingly, the data transmission-command transmit control means 12 terminates the notification of the data transmission commands.

Next, the present invention will further be explained by detailed embodiments.

FIRST EMBODIMENT

FIG. 7 shows one example of a configuration of the data transmission monitoring means 11 of the data receiver 2. In the drawing, the data transmission monitoring means 11 has a transmission unit receiving function 113, a data transmission identifying function 111 and a transmission unit counting function 112. The transmission unit receiving function 113 receives therein all the transmission units sent through a sending medium and transmits the same to the data transmission identifying function 111. The data transmission identifying function 111 extracts a sender identifier and a transmission port identifier included in the received transmission units transmitted from the transmission unit receiving function 113 to thereby form an identifier for a data transmission to which each received transmission unit belongs. Thereafter, the data transmission identifying function 111 checks the formed identifier against a data transmission identifier delivered thereto from the data transmission-command transmit control means 12. If they are found to be identical to each other, then the data transmission identifying function 111 transmits the contents of its coincidence to the transmission unit counting function 112. The transmission unit counting function 112 starts to count the contents thereof delivered from the data transmission identifying function 111 in response to a start signal delivered from the data transmission-command transmit control means 12. When the result of counting by the data transmission unit counting function 112 reaches 1, the transmission unit counting function 112 notifies a received signal to the data transmission-command transmit control means 12.

FIG. 8 illustrates one example of a configuration of the data transmission-command transmit control means 12 of the data receiver 2. In the drawing, the data transmission-command transmit control means 12 has a data transmission-command temporary storing function 121, a data transmission command generating function 122 and a data transmission command success/failure determining function 123. The data transmission-command temporary storing function 121 temporarily stores therein the contents of data transmission commands transmitted from data transmission control means 8 (see FIG. 6) and transmits the stored contents to the data transmission command generating function 122. Taking this opportunity, the data transmission-command temporary storing function 121 notifies a start signal to each of the data transmission command success/failure determining function 123 and the data transmission monitoring means 11. Further, the data transmission-command temporary storing function 121 extracts an identifier for the transmission of data from the contents stored therein and transmits it to the data transmission monitoring means 11. The data transmission identifier consists of a sender identifier and a transmission port identifier.

The data transmission command generating function 122 generates data transmission commands including the contents of the data transmission commands transmitted thereto from the data transmission-command temporary storing function 121. After an error detecting code has been added to the generated data transmission commands, the data transmission command generating function 122 continuously sends the so-processed commands (see FIGS. 10 and 11). As the error detecting code, a CRC code or a parity code can be used. The data transmission command generating function 122 stops the continuous transmission in response to the transmission of an affirmative signal outputted from the data transmission command success/failure determining function 123.

In response to the start signal transmitted from the data transmission-command temporary storing function 121, the data transmission command success/failure determining function 123 enters a state of waiting for the received signal transmitted from the data transmission monitoring means 11. Upon receipt of its transmission, the data transmission command success/failure determining function 123 transmits the affirmative signal to the data transmission command generating function 122.

Figure 9:
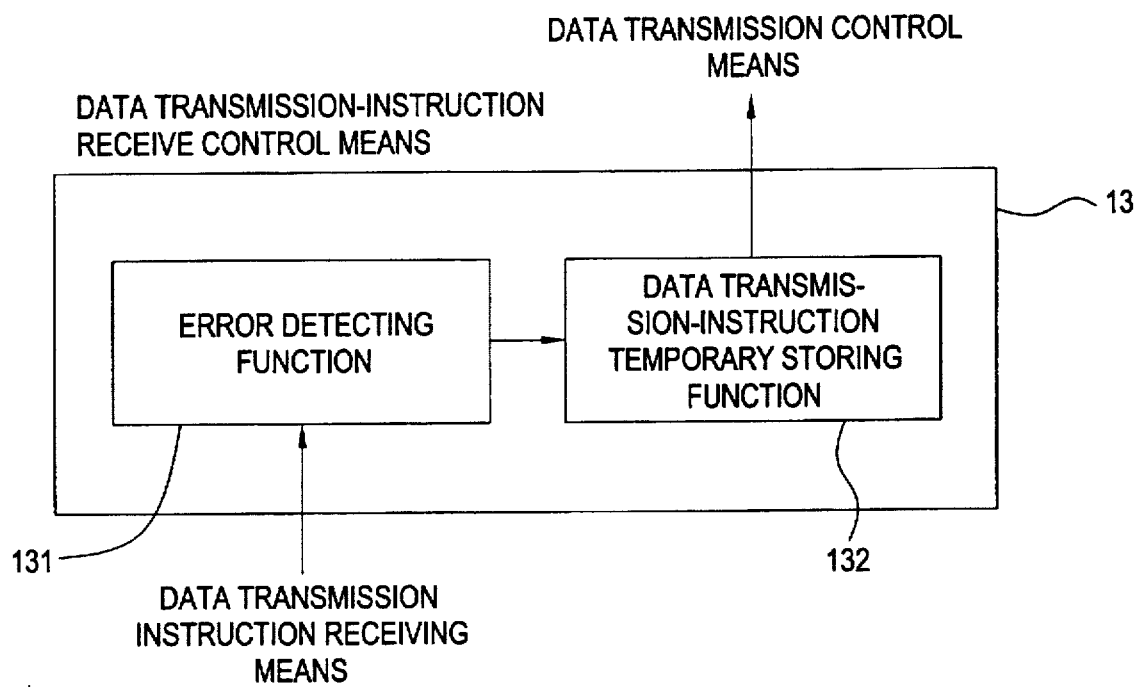
FIG. 9 is a block diagram showing an example of a configuration of data transmission-command receive control means 13 employed in the first embodiment.

FIG. 9 shows one example of a configuration of the data transmission-command receive control means 13 of the data sender 1. In the drawing, the data transmission-command receive control means 13 has an error detecting function 131 and a data transmission-command temporary storing function 132. The error detecting function 131 determines whether data transmission commands transmitted thereto from data transmission command receiving means 4 produce an error in transmission. The transmission error can be detected using the error detecting code included in the data transmission commands. The data transmission commands from which the transmission error has been detected, are abandoned. The data transmission commands determined to be free of any transmission error are transmitted to the data transmission-command temporary storing function 132. Whether or not a transmission error exists may be determined by a majority decision using a plurality of continuously-transmitted data transmission commands.

The data transmission-command temporary storing function 132 checks the data transmission commands transmitted thereto from the error detecting function 131 against the temporarily-stored data transmission commands. If they are found to be identical to each other, then the data transmission-command temporary storing function 132 abandons the former data transmission commands. If they are found to be different from each other, then the data transmission-command temporary storing function 132 updates the temporarily-stored data transmission commands in response to the notified data transmission commands and simultaneously notifies the data transmission commands to the data transmission control means 5.

Figure 10:
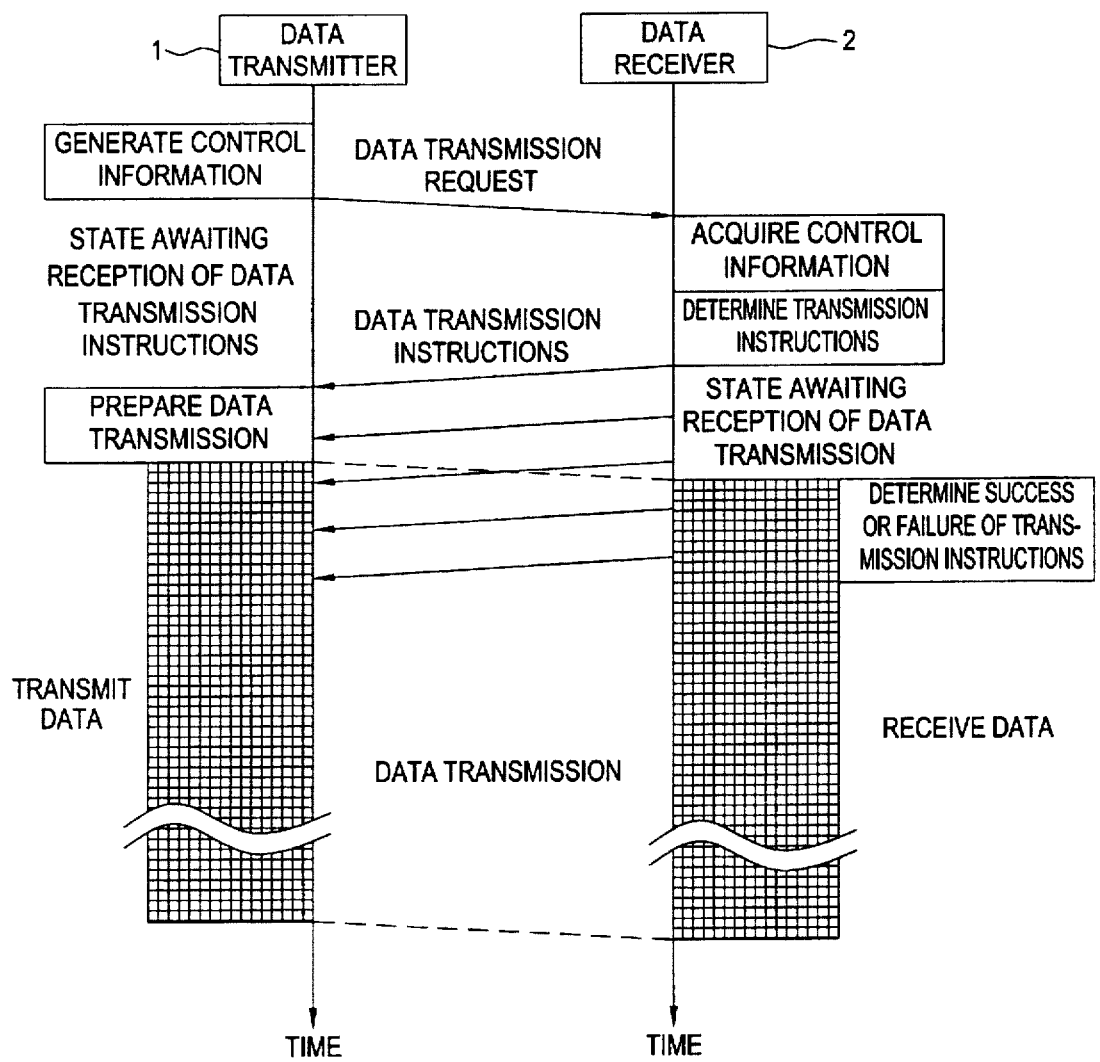
FIG. 10 is a diagram for describing the operation of the first embodiment.
Figure 11:
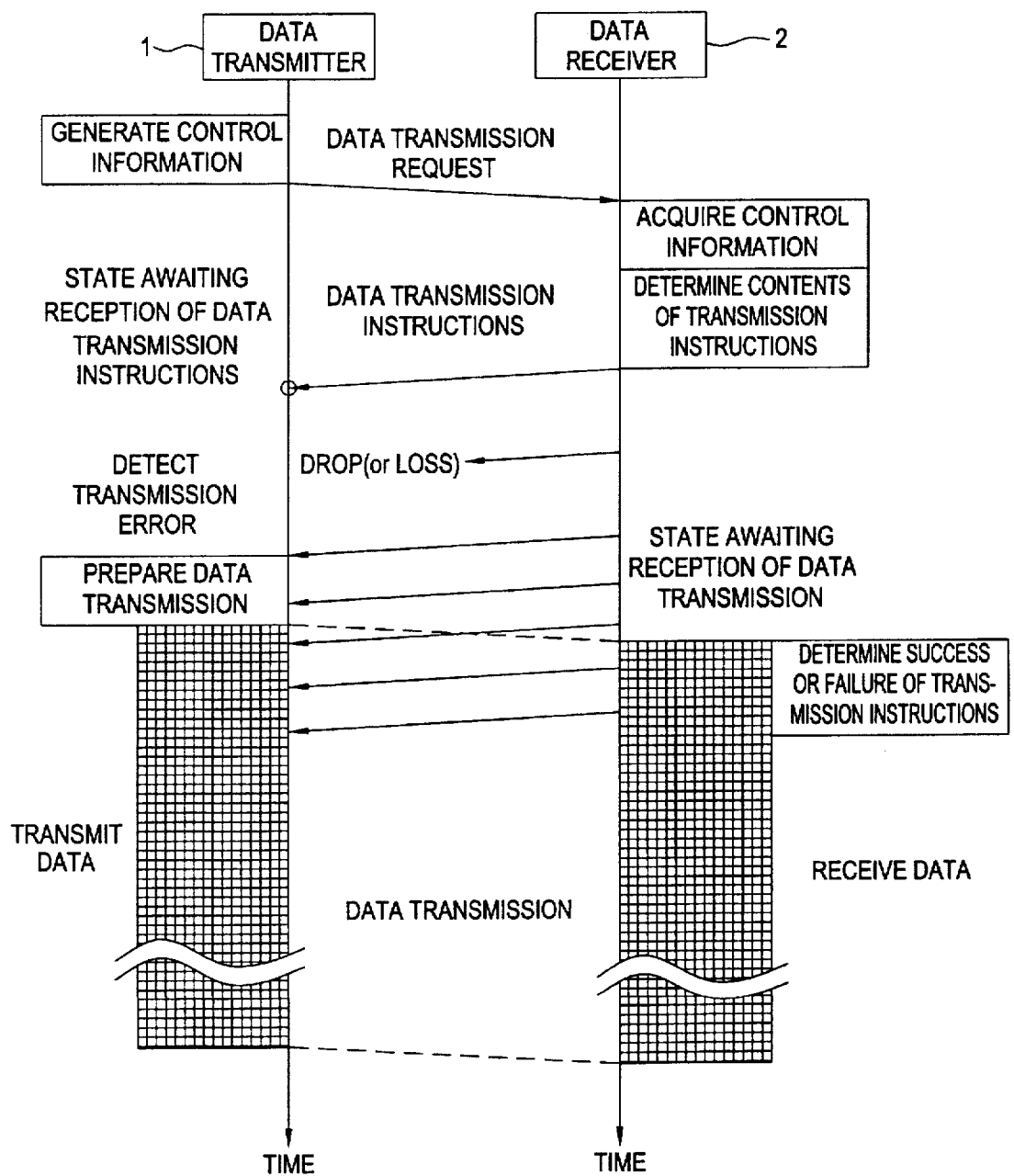
FIG. 11 is a diagram for explaining the operation of the first embodiment.

FIG. 10 is a diagram for describing the operation of the data transmission apparatus at the time that a request for the transfer of data from the data sender 1 to the data receiver 2 is made. FIG. 11 is a diagram for describing the operation of the data transmission apparatus at the time that data transmission commands incur a transmission error.

In FIG. 10, the data sender 1 intended to send data generates control information therefrom and transmits a data transmission request to the data receiver 2. The data receiver 2 acquires the control information from the data transmission request to thereby determine data transmission commands and transmits the data transmission commands to the data sender 1. The data transmission commands are repeatedly sent to the data sender 1 until data is transmitted from the data sender 1. The data sender 1 receives the data transmission commands (including ones whose errors have been corrected) therein successfully and starts to transmit the data after the elapse of a data transmission preparatory period. The data receiver 2 receives the data therein and determines the data transmission commands to have resulted in success, thereby stopping the delivery of the data transmission commands to the data sender 1.

Referring also to FIG. 11, a data receiver 2 transmits data transmission commands to a data sender 1 in a manner similar to FIG. 10. In the present example, however, an uncorrectable error is detected upon the first transmission but the second transmission dropped in the course of the data transmission commands. However, since the data transmission commands are continuously repeated until the data receiver 2 receives data therein, the data transmission commands are sent in succession. Soon, the third transmission is successfully received by the data receiver 2. Thus, the data sender 1 sends data to the data receiver 2 after the elapse of a data transmission preparatory period and the data receiver 2 receives it therein. Afterwards, the data receiver 2 stops the delivery of the data transmission commands to the data sender 1.

In the present example as described above, since the data transmission commands are continuously made until the data receiver 2 itself confirms the transmission of data even if the data transmission commands issued from the data receiver 2 are not properly received, it is possible to reliably provide the commands for the data transmission. Further, a shakehand process and a timeout process cause no losses.

SECOND EMBODIMENT

Figure 12:
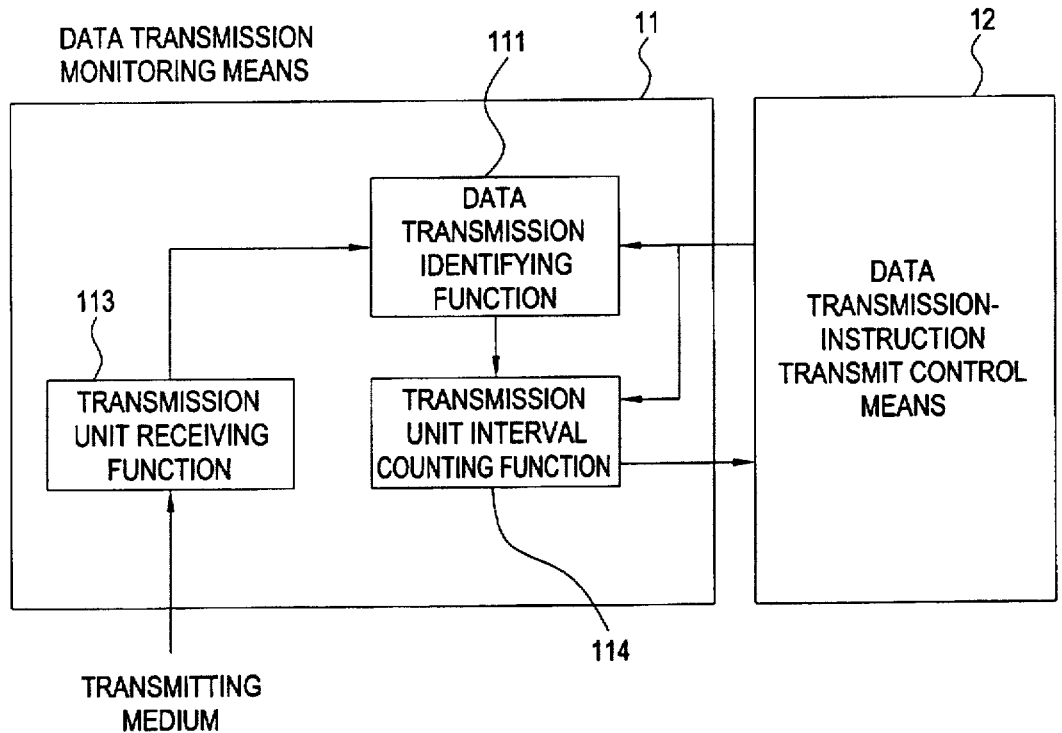
FIG. 12 is a block diagram showing an example of a configuration of data transmission monitoring means 11 employed in a second embodiment of the present invention.

Next, the present invention will further be described by reference to a second embodiment of the present invention. FIG. 12 shows one example of a configuration of data transmission monitoring means 11 of a data receiver 2. In the same drawing, the data transmission monitoring means 11 has a transmission unit receiving function 113, a data transmission identifying function 111 and a transmission unit interval counting function 114. The transmission unit receiving function 113 receives therein all the transmission units sent through a sending medium and notifies the same to the data transmission identifying function 111. The data transmission identifying function 111 extracts a sender identifier and a transmission port identifier included in the received transmission units transmitted from the transmission unit receiving function 113 to thereby form an identifier for a data transmission to which each received transmission unit belongs. Thereafter, the data transmission identifying function 111 checks the formed identifier against a data transmission identifier delivered thereto from data transmission-command transmit control means 12. If they are found to be identical to each other, then the data transmission identifying function 111 transmits a count signal to the transmission unit interval counting function 114 (including a transmission unit counting function). This operation needs to be over in a certain fixed time shorter than a transmission time necessary for each transmission unit.

In response to a start signal transmitted from the data transmission-command transmit control means 12, the transmission unit interval counting function 114 starts to count the count signal transmitted from the data transmission identifying function 111 and count a transmission interval of the count signal. A clock for counting the transmission interval may be arbitrary. However, a receiving clock introduced from a sending medium or a sending clock to the sending medium is available. When the result of counting of the count signal reaches a constant value determined in advance, the transmission unit interval counting function 114 determines an average interval from the result obtained by counting the transmission interval of the count signal and the result of counting of the count signal and transmits it to the data transmission-command transmit control means 12 as a data reception interval. The constant value referred to above may be 2.

Figure 13:
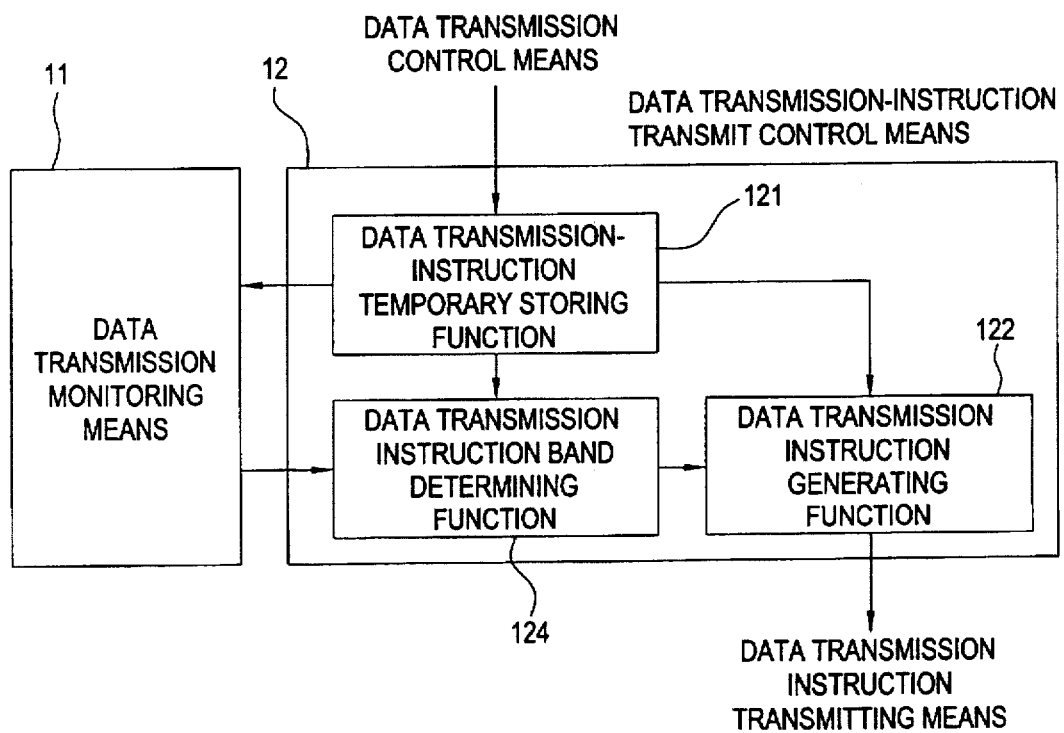
FIG. 13 is a block diagram illustrating an example of a configuration of data transmission-command transmit control means 12 employed in the second embodiment.

FIG. 13 illustrates one example of a configuration of the data transmission-command transmit control means 12 of the data receiver 2. In the same drawing, the data transmission-command transmit control means 12 has a data transmission-command temporary storing function 121, a data transmission command generating function 122 and a data transmission bit rate determining function 124. The data transmission-command temporary storing function 121 temporarily stores therein the contents of data transmission commands transmitted from data transmission control means 8 (see FIG. 6). Further, the data transmission-command temporary storing function 121 transmits the stored contents to the data transmission command generating function 122. Taking this opportunity, the data transmission-command temporary storing function 121 transmits a start signal to each of the data transmission bit rate determining function 124 and the data transmission monitoring means 11. Further, the data transmission-command temporary storing function 121 extracts an identifier for the transmission of data from the contents stored therein and transmits it to the data transmission monitoring means 11. The data transmission identifier comprises a sender identifier and a transmission port identifier.

The data transmission command generating function 122 generates data transmission commands including the contents of the data transmission commands notified thereto from the data transmission-command temporary storing function 121. After an error detecting code has been added to the generated data transmission commands, the data transmission command generating function 122 continuously sends the so-processed commands. As the error detecting code, a CRC code or a parity code can be used. The data transmission command generating function 122 stops the continuous transmission in response to the transmission of an affirmative signal outputted from the data transmission bit rate determining function (including a data transmission command success/failure determining function) 124. In response to the transmission of a negative signal outputted from the data transmission bit rate determining function 124, the data transmission command generating function 122 generates data transmission commands for relatively changing a use or available bandwidth by the difference between a use bandwidth included in the negative signal and the data transmission commands and continuously sends the generated data transmission commands in the same manner as described above.

In response to the start signal notified from the data transmission-command temporary storing function 121, the data transmission bit rate determining function 124 enters a state of waiting for the data reception interval notified from the data transmission monitoring means 11. Upon receipt of the transmission of the data reception interval, the data transmission bit rate determining function 124 determines a bit rate to be used for the data transmission from the value thereof. Assuming that the data reception interval is defined as m [sec] and the transmission unit length is defined as p [bit], a bit rate B [bit/sec] to be used can be derived from the following equation:

$$B = p/m$$

The so-obtained bit rate used for the data transmission is compared with the contents of the transmission bandwidth commands included in the data transmission commands transmitted from the data transmission-command temporary storing function 121. When they are found to be identical to each other, the data transmission bit rate determining function 124 transmits an affirmative signal to the data transmission command generating function 122. On the other hand, when they are found to be different from each other, the data transmission bit rate determining function 124 transmits a negative signal including the difference between the bit rate B to be used and the data transmission commands to the data transmission command generating function 122. Upon determining whether the bit rate to be used is set as the data transmission commands, (B−e to B+e) may be used by making allowance for a predetermined error range e on the bit rate B to be used.

Figure 14:
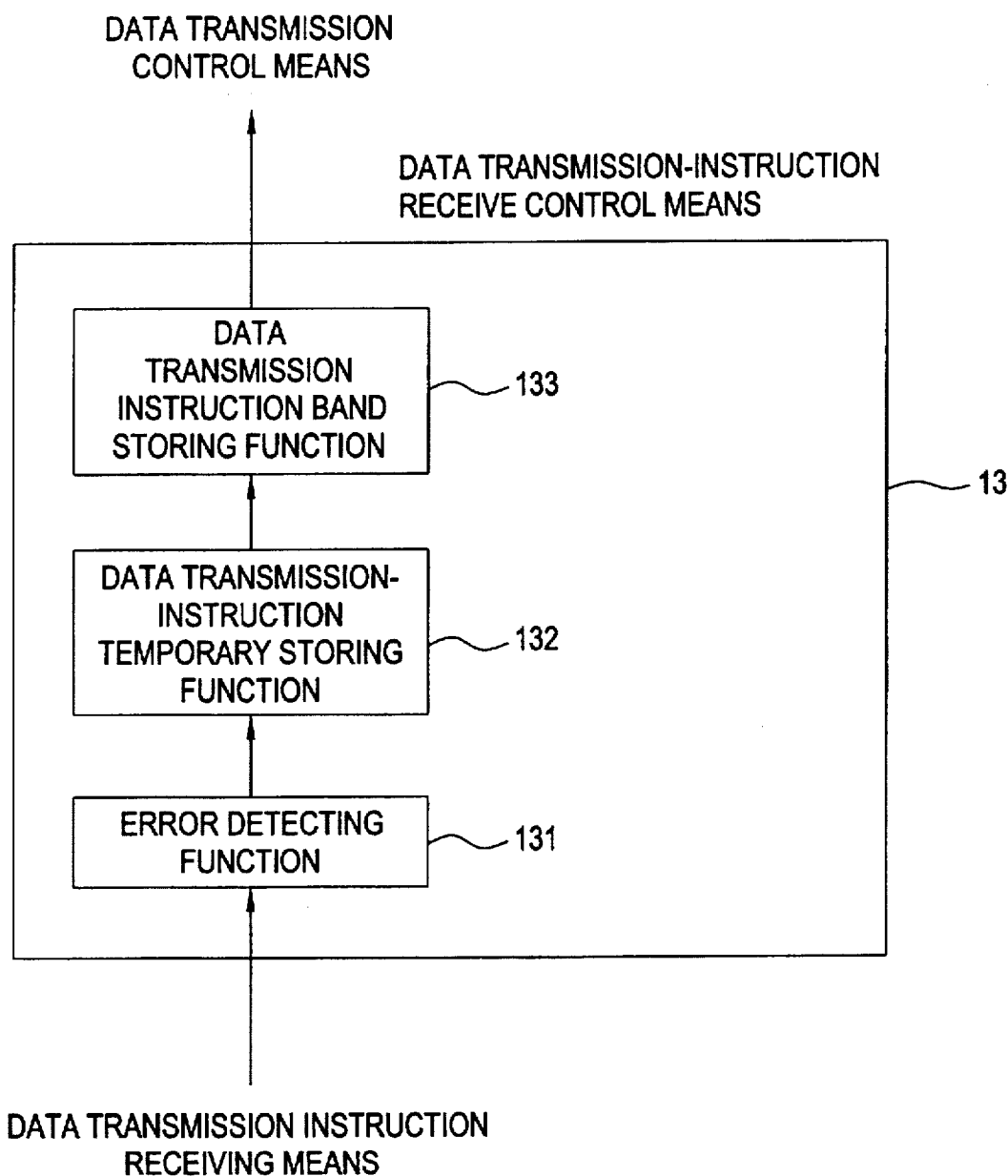
FIG. 14 is a block diagram depicting an example of a configuration of data transmission-command receive control means 13 employed in the second embodiment.

FIG. 14 shows one example of a configuration of the data transmission-command receive control means 13 of the data sender 1. In the same drawing, the data transmission-command receive control means 13 has an error detecting function 131, a data transmission-command temporary storing function 132 and a data transmission bit rate storing function 133. The error detecting function 131 determines whether data transmission commands transmitted thereto from data transmission command receiving means 4 produce an error in transmission. The transmission error can be detected using the error detecting code included in the data transmission commands. The data transmission commands from which the transmission error has been detected, are abandoned. The data transmission commands determined to be free of any transmission error are transmitted to the data transmission-command temporary storing function 132. Whether or not a transmission error exists may be determined by a majority decision using a plurality of continuously-notified data transmission commands.

The data transmission-command temporary storing function 132 checks the data transmission commands transmitted thereto from the error detecting function 131 against the temporarily-stored data transmission commands. If they are found to be identical to each other, then the data transmission-command temporary storing function 132 abandons the former data transmission commands. If they are found to be different from each other, then the data transmission-command temporary storing function 132 updates the temporarily-stored data transmission commands in response to the transmitted data transmission commands and simultaneously transmitted the data transmission commands to the data transmission bit rate storing function 133. The data transmission bit rate storing function 133 has already stored therein the contents of commands about the transmission bandwidth included in the data transmission commands. When relative commands for a transmission bandwidth are provided in the data transmission commands transmitted from the data transmission-command temporary storing function 132, the data transmission bit rate storing function 133 generates data transmission commands including the contents for providing commands for the absolute magnitude of a bandwidth to be used, based on the stored contents of transmission bandwidth commands and the relative commands in the data transmission commands and transmits the generated data transmission commands to the data transmission control means 5.

Figure 15:
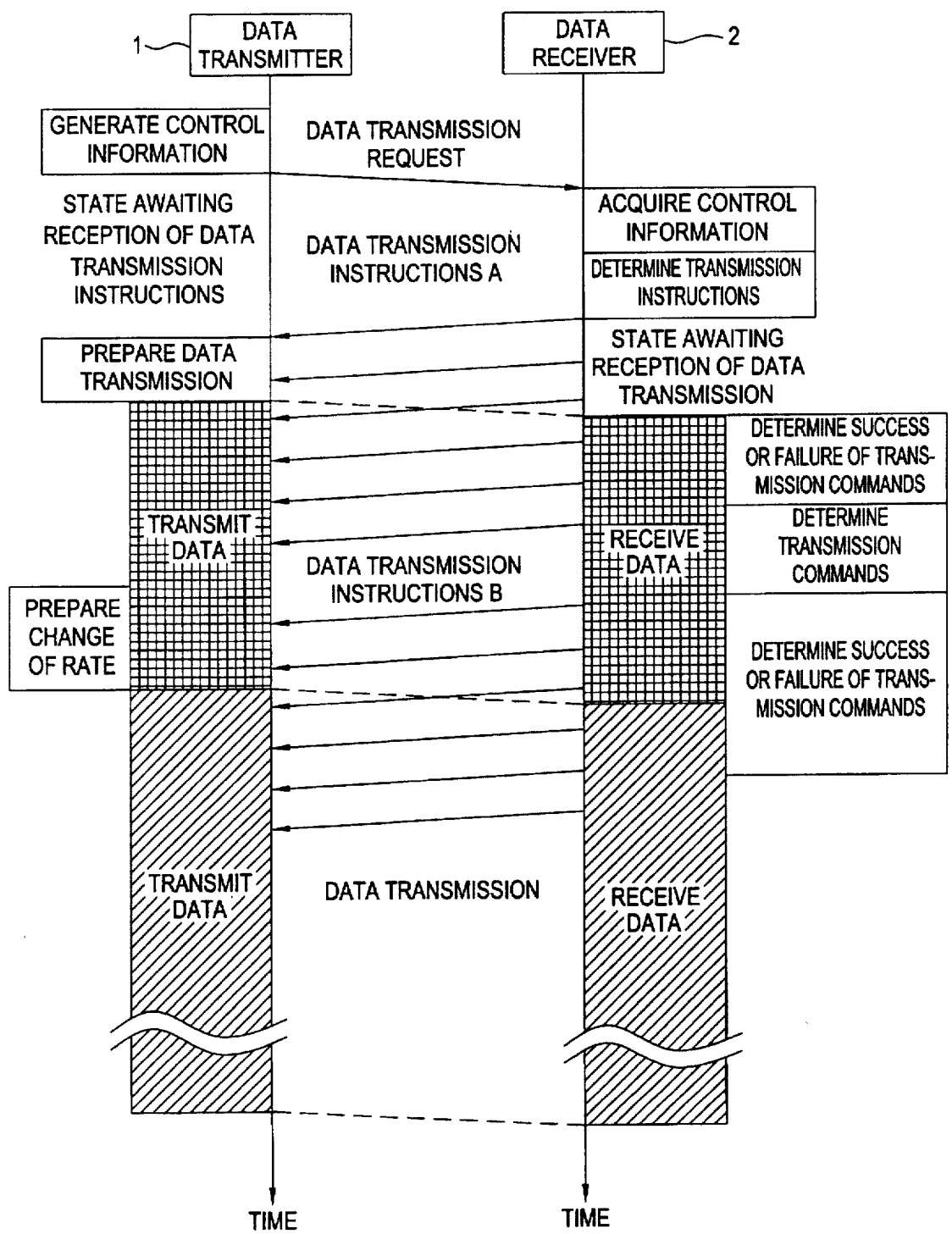
FIG. 15 is a diagram for describing the operation of the second embodiment.

FIG. 15 is a diagram for explaining the operation of the present embodiment at the time that the effected data transmission bandwidth differs from the data transmission commands. In the drawing, the data sender 1 first generates control information therefrom and transmits a data transmission request to the data receiver 2. The data receiver 2 obtains the control information on the basis of the data transmission request to thereby determine data transmission commands and sends the data transmission commands (A) to the data sender 1. The data transmission commands (A) are repeatedly transmitted to the data sender 1. When the data sender 1 receives the data transmission commands (A) therein, it starts to make preparations for the transmission of data and thereafter transmits data to the data receiver 2. Based on the data delivered to the data receiver 2, the data receiver 2 makes a decision as to whether the data transmission commands have successfully been made. Since the data transmission commands have properly been sent in the present example (the identifier is proper but the transmission bandwidth is shifted), the data receiver 2 stops the delivery of the data transmission commands (A) to the data sender 1.

In the present example, the transmission bandwidth set according to the environment of the data transmission is shifted from the actual bit rate. The data transmission bit rate determining function 124 of the data transmission-command transmit control means 12 in the data receiver 2 adjusts the commanded bandwidth and the data transmission command generating function 122 generates data transmission commands (B) for specifying the adapted bandwidth. The generated data transmission commands (B) are transmitted to the data sender 1. The data sender 1 changes the bit rate, based on the transmission thereof and transmits data to the data receiver 2. The data receiver 2 confirms that the bandwidth for the data delivered to the data receiver 2 is proper, and thereafter stops the delivery of the data transmission commands.

According to the present example as described above, the data transmission commands can be reliably provided without the losses of the handshake and timeout processes. Further, even if the actual use bandwidth is shifted from the specified one, the specified bandwidth can be reliably adjusted so as to be used.

According to the present invention, when data transmission commands produce a transmission error, it can be corrected so as to avoid a failure in contention control. Further, since no handshake procedure for retransmission control is performed, an advantageous effect can be brought about that a reduction in the efficiency of utilization of a bandwidth due to the transmission error produced in the data transmission commands can be minimized. According to the present invention as well, since the delivery of data transmission commands is determined from the contents of the data transmission commands and their resulting data transmissions, an advantageous effect can be obtained that even transmission errors produced in a sender or receiver can be detected as well as an error in the transmission of data on a sending medium.

What is claimed is:

1. A data transmission apparatus comprising:

a data sender and a data receiver, wherein data outputted from said data sender is transmitted to said data receiver and said data receiver transmits data transmission commands to said data sender prior to the transfer of the data from said data sender to said data receiver;

a means for monitoring a form of the transmission of the data from said data sender to said data receiver, said means for monitoring being operatively coupled to said data receiver;

means for controlling the transmission of said data transmission commands based on the result of monitoring by said monitoring means, said means for controlling being operatively coupled with said means for monitoring; and means for detecting the data transmission commands including a transmission error or identical data transmission commands to thereby control the reception of the data transmission commands, said means for detecting being operatively coupled to said data sender;

wherein the means for detecting abandons a first received data transmission command including the transmission error or the data transmission command when a second received data transmission command is identical to the first received data transmission command.

2. A data transmission apparatus according to claim 1, wherein the form of said data transmission indicates the presence or absence of a data transmission.

3. A data transmission apparatus according to claim 1, wherein the form of said data transmission indicates a bit rate to be used for the transmission of the data.

4. A method of sending data from a data sender to a data receiver through a data sending medium, comprising:

continuously sending data transmission commands from said data receiver to said data sender prior to the transfer of the data from said data sender to said data receiver;

detecting the data transmission commands including a transmission error or identical data transmission commands at the data sender to thereby control the reception of the data transmission commands;

starting the transmission of the data from said data sender to said data receiver based on said continuously-transmitted data transmission commands;

monitoring a form of the transmission of the data from said data sender to said data receiver; and terminating the transmission of said data transmission commands, based on the result of said monitoring;

wherein the step of detecting includes abandoning a first received data transmission command including the transmission error or the data transmission command when a second received data transmission command is identical to the first received data transmission command.

5. A method of sending data from a data sender according to claim 4, wherein the form of said data transmission indicates the presence or absence of a data transmission.

6. A method of sending data from a data sender according to claim 4, wherein the form of said data transmission indicates a bit rate to be used for the transmission of the data.

7. A data transmission apparatus comprising:
- a data sender and a data receiver, wherein data outputted from said data sender is transmitted to said data receiver and said data receiver transmits data transmission commands to said data sender prior to the transfer of the data from said data sender to said data receiver;
- a monitor monitoring a form of the transmission of the data from said data sender to said data receiver, said monitor being operatively coupled to said data receiver;
- a controller controlling the transmission of said data transmission commands based on the result of monitoring by said monitor, said controller being operatively coupled with said monitor; and
- a detector detecting the data transmission commands including a transmission error or identical data transmission commands to thereby control the reception of the data transmission commands, said detector being operatively coupled to said data senders;

wherein the detector abandons a first received data transmission command including the transmission error or the data transmission command when a second received data transmission command is identical to the first received data transmission command.

8. A data transmission apparatus according to claim 7, further comprising a transmitter transmitting said data transmission commands prior to transmission of said data from said data sender to said data receiver, said transmitter being operatively coupled to said controller.

9. A data transmission apparatus according to claim 7, further comprising a transmitter transmitting said data from said data sender to said data receiver based on the data transmission commands received by said data sender from said data receiver, said transmitter being operatively coupled to said controller.

10. A data transmission apparatus according to claim 7, wherein the form of said data transmission indicates the presence or absence of a data transmission.

11. A data transmission apparatus according to claim 7, wherein the form of said data transmission indicates a bit rate to be used for the transmission of the data.

* * * * *